(12) United States Patent
Patel et al.

(10) Patent No.: US 10,664,185 B2
(45) Date of Patent: May 26, 2020

(54) BACKEND-AWARE EXTENT BALANCING

(71) Applicant: International Business Machines Corporation, Armonk, NY (US)

(72) Inventors: Kushal S. Patel, Pune (IN); Shalaka Verma, Mumbai (IN); Mohit Chitlange, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/011,474

(22) Filed: Jun. 18, 2018

(65) Prior Publication Data

US 2019/0384521 A1     Dec. 19, 2019

(51) Int. Cl.
    *G06F 3/06*        (2006.01)

(52) U.S. Cl.
CPC ............ *G06F 3/0647* (2013.01); *G06F 3/067* (2013.01); *G06F 3/0631* (2013.01); *G06F 3/0653* (2013.01); *G06F 3/0616* (2013.01); *G06F 3/0635* (2013.01)

(58) Field of Classification Search
None
See application file for complete search history.

(56) References Cited

U.S. PATENT DOCUMENTS

| | | | |
|---|---|---|---|
| 6,745,286 B2 * | 6/2004 | Staub | G06F 9/5083 711/114 |
| 8,583,838 B1 | 11/2013 | Marshak et al. | |
| 8,782,324 B1 * | 7/2014 | Chen | G06F 12/0238 711/102 |
| 8,868,797 B1 | 10/2014 | Kirac et al. | |
| 8,935,493 B1 | 1/2015 | Dolan et al. | |
| 9,047,017 B1 | 6/2015 | Dolan et al. | |
| 9,274,941 B1 | 3/2016 | Throop et al. | |
| 9,971,548 B1 * | 5/2018 | Talwar | G06F 3/0613 |
| 2005/0071550 A1 | 3/2005 | Lowe et al. | |
| 2012/0072662 A1 * | 3/2012 | Jess | G06F 12/0653 711/114 |
| 2014/0359380 A1 | 12/2014 | Chiu et al. | |
| 2015/0286419 A1 | 10/2015 | Guo et al. | |

OTHER PUBLICATIONS

NIST, "NIST Cloud Computing Program," NIST, Information Technology Laboratory, Nov. 13, 2013, pp. 1-2, retrieved from www.nist.gov/itl/cloud/.

(Continued)

*Primary Examiner* — Charles Rones
*Assistant Examiner* — Hewy H Li
(74) *Attorney, Agent, or Firm* — Zilka-Kotab, P.C.

(57) ABSTRACT

A computer-implemented method according to one embodiment includes identifying an extent to be relocated within a storage environment, determining a current workload of each of a plurality of storage drives within the storage environment, determining current performance capabilities of each of a plurality of backend storage controllers associated with the plurality of storage drives within the storage environment, and moving the extent to one of the plurality of storage drives, based on the current workload for each of the plurality of storage drives and the current performance capabilities of the plurality of backend storage controllers.

18 Claims, 7 Drawing Sheets

(56) References Cited

OTHER PUBLICATIONS

Mell et al., "The NIST Definition of Cloud Computing: Version 15," National Institute of Standards and Technology, Oct. 7, 2009, 2 pages.
Mell et al., "The NIST Definition of Cloud Computing," Recommendations of the National Institute of Standards and Technology, NIST Special Publication 800-145, Sep. 2011, pp. 1-7.
IBM, "Storage Systems—Almaden," IBM Research, 2018, 5 pages retrieved from http://www.almaden.ibm.com/storagesystems/projects/easytier/.

* cited by examiner

BACKEND-AWARE EXTENT BALANCING

BACKGROUND

The present invention relates to data storage, and more specifically, this invention relates to balancing extents within data storage of a storage virtualization environment.

Storage pools are commonly used to provide virtualized storage to one or more applications. Currently, however, a capacity of backend storage controllers associated with such storage pools is not considered when performing extent balancing across LUNs in a storage pool. This may create performance issues if the backend is not healthy, not capable of serving increased I/O traffic, overloaded, or not proper for a workload of a candidate extent.

SUMMARY

A computer-implemented method according to one embodiment includes identifying an extent to be relocated within a storage environment, determining a current workload of each of a plurality of storage drives within the storage environment, determining current performance capabilities of each of a plurality of backend storage controllers associated with the plurality of storage drives within the storage environment, and moving the extent to one of the plurality of storage drives, based on the current workload for each of the plurality of storage drives and the current performance capabilities of the plurality of backend storage controllers.

According to another embodiment, a computer program product for performing backend-aware extent balancing comprises a computer readable storage medium having program instructions embodied therewith, where the computer readable storage medium is not a transitory signal per se, and where the program instructions are executable by a processor to cause the processor to perform a method comprising identifying an extent to be relocated within a storage environment, utilizing the processor, determining a current workload of each of a plurality of storage drives within the storage environment, utilizing the processor, determining current performance capabilities of each of a plurality of backend storage controllers associated with the plurality of storage drives within the storage environment, utilizing the processor, and moving the extent to one of the plurality of storage drives, utilizing the processor, based on the current workload for each of the plurality of storage drives and the current performance capabilities of the plurality of backend storage controllers.

A system according to another embodiment includes a processor, and logic integrated with the processor, executable by the processor, or integrated with and executable by the processor, where the logic is configured to identify an extent to be relocated within a storage environment, determine a current workload of each of a plurality of storage drives within the storage environment, determine current performance capabilities of each of a plurality of backend storage controllers associated with the plurality of storage drives within the storage environment, and move the extent to one of the plurality of storage drives, based on the current workload for each of the plurality of storage drives and the current performance capabilities of the plurality of backend storage controllers.

Other aspects and embodiments of the present invention will become apparent from the following detailed description, which, when taken in conjunction with the drawings, illustrate by way of example the principles of the invention.

DETAILED DESCRIPTION

Figure 1:
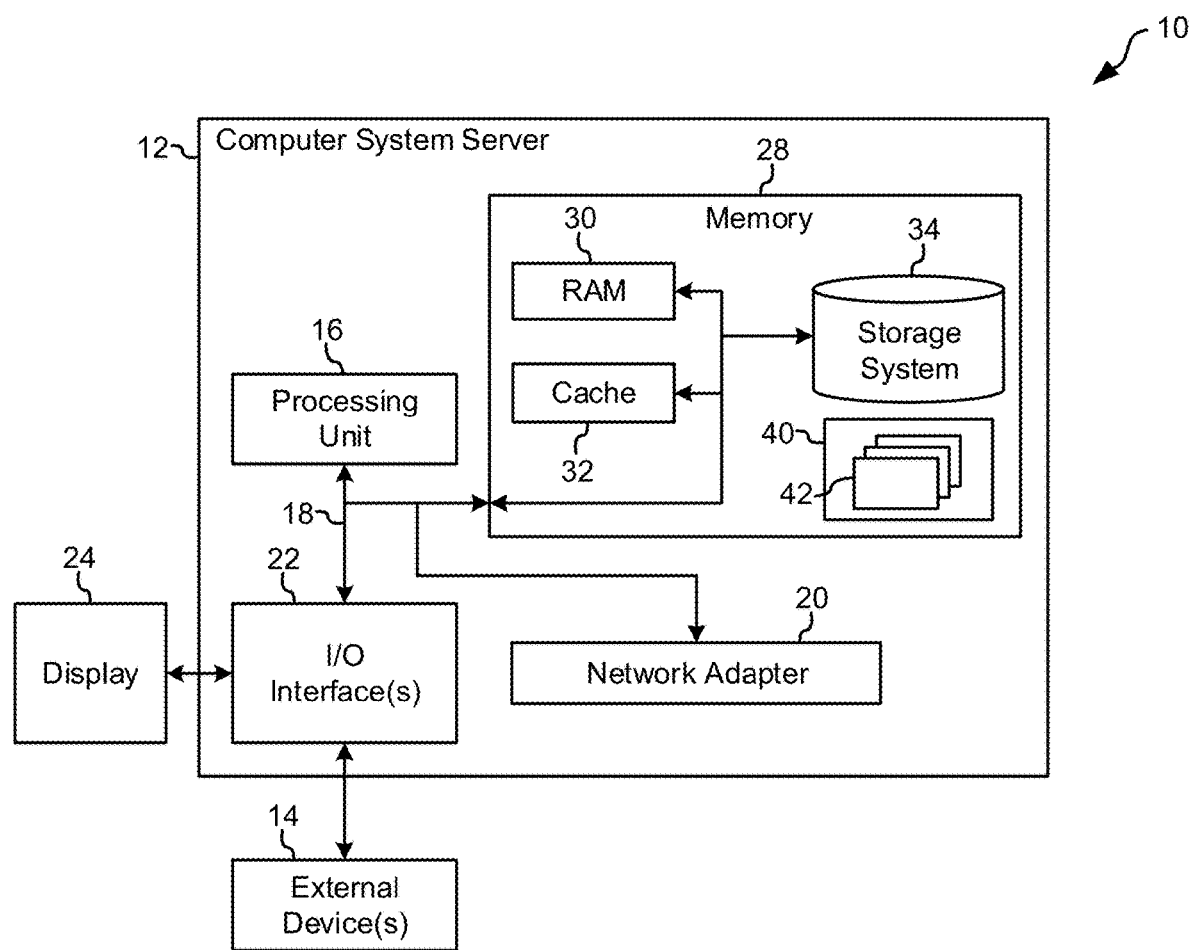
FIG. 1 depicts a cloud computing node according to an embodiment of the present invention.

The following description discloses several preferred embodiments of systems, methods and computer program products for performing backend-aware extent balancing. Various embodiments provide a method for balancing extents within a storage environment, based on storage drive workloads as well as backend storage controller performance capabilities.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing backend-aware extent balancing.

In one general embodiment, a computer-implemented method includes identifying an extent to be relocated within a storage environment, determining a current workload of each of a plurality of storage drives within the storage environment, determining current performance capabilities of each of a plurality of backend storage controllers associated with the plurality of storage drives within the storage environment, and moving the extent to one of the plurality of storage drives, based on the current workload for each of the plurality of storage drives and the current performance capabilities of the plurality of backend storage controllers.

In another general embodiment, a computer program product for performing backend-aware extent balancing comprises a computer readable storage medium having program instructions embodied therewith, where the computer readable storage medium is not a transitory signal per se, and where the program instructions are executable by a processor to cause the processor to perform a method comprising identifying an extent to be relocated within a storage environment, utilizing the processor, determining a current workload of each of a plurality of storage drives within the storage environment, utilizing the processor, determining current performance capabilities of each of a plurality of backend storage controllers associated with the plurality of storage drives within the storage environment, utilizing the processor, and moving the extent to one of the plurality of storage drives, utilizing the processor, based on the current workload for each of the plurality of storage drives and the current performance capabilities of the plurality of backend storage controllers.

In another general embodiment, a system includes a processor, and logic integrated with the processor, executable by the processor, or integrated with and executable by the processor, where the logic is configured to identify an extent to be relocated within a storage environment, determine a current workload of each of a plurality of storage drives within the storage environment, determine current performance capabilities of each of a plurality of backend storage controllers associated with the plurality of storage drives within the storage environment, and move the extent to one of the plurality of storage drives, based on the current workload for each of the plurality of storage drives and the current performance capabilities of the plurality of backend storage controllers.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
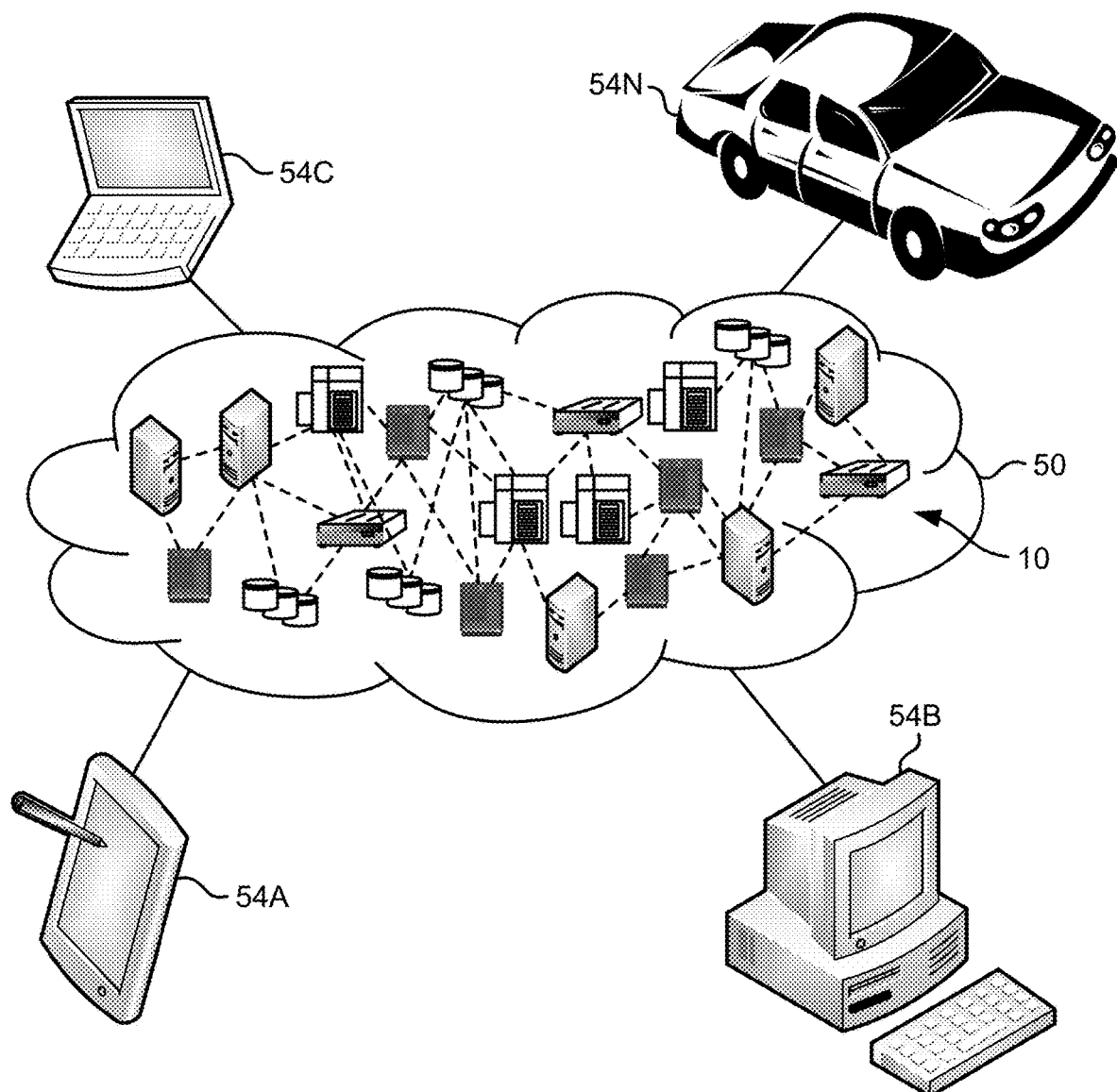
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
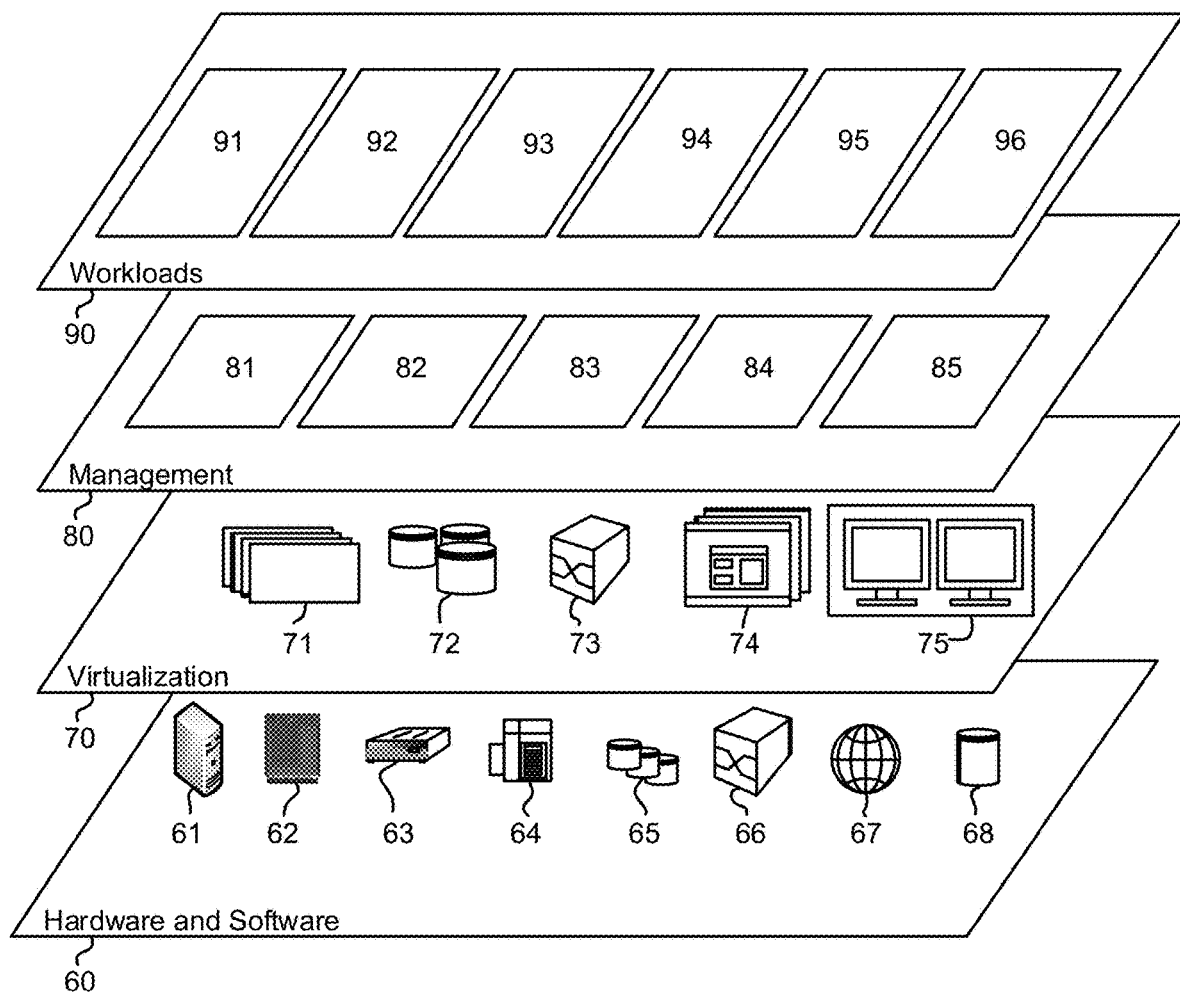
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
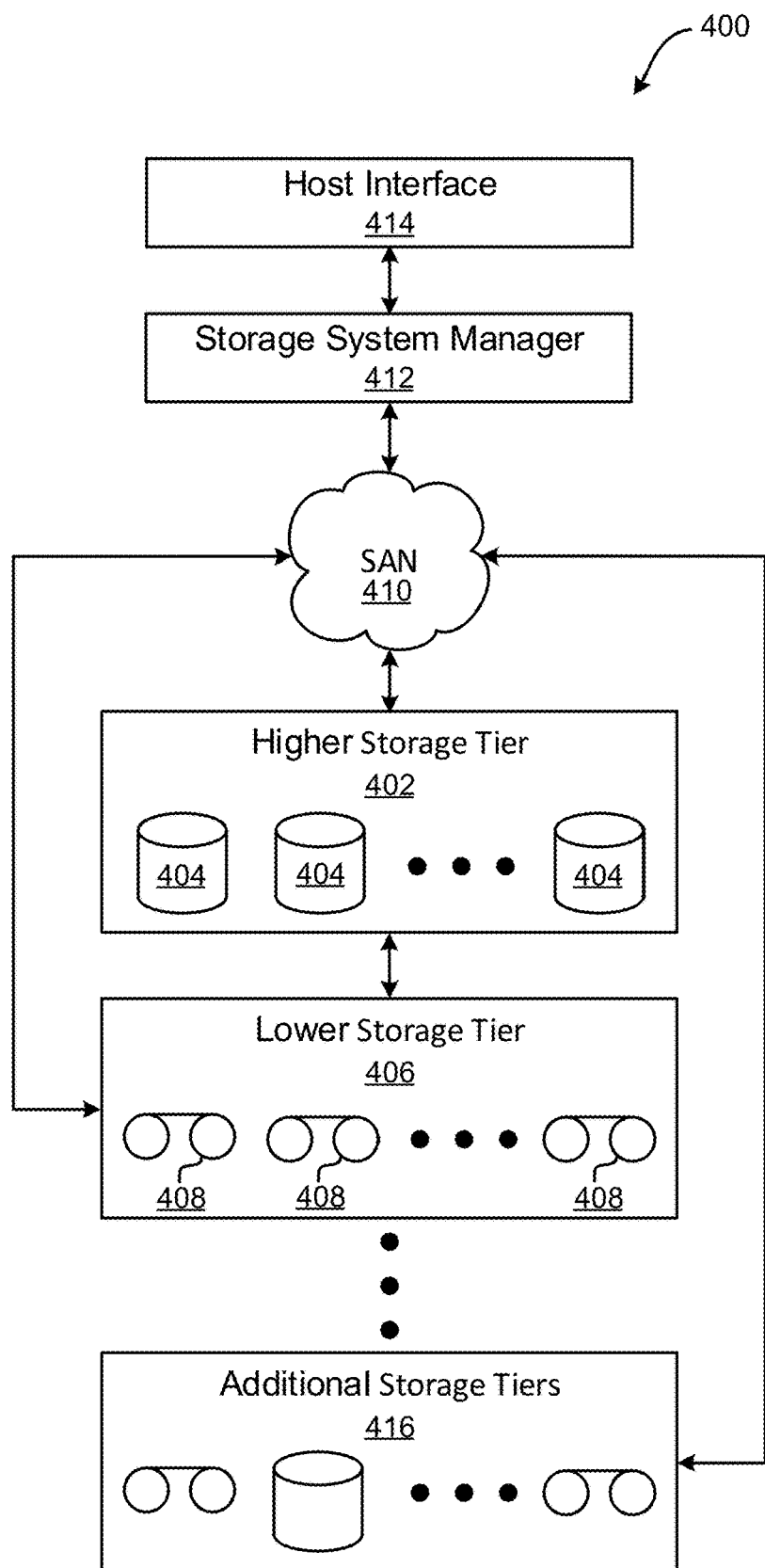
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
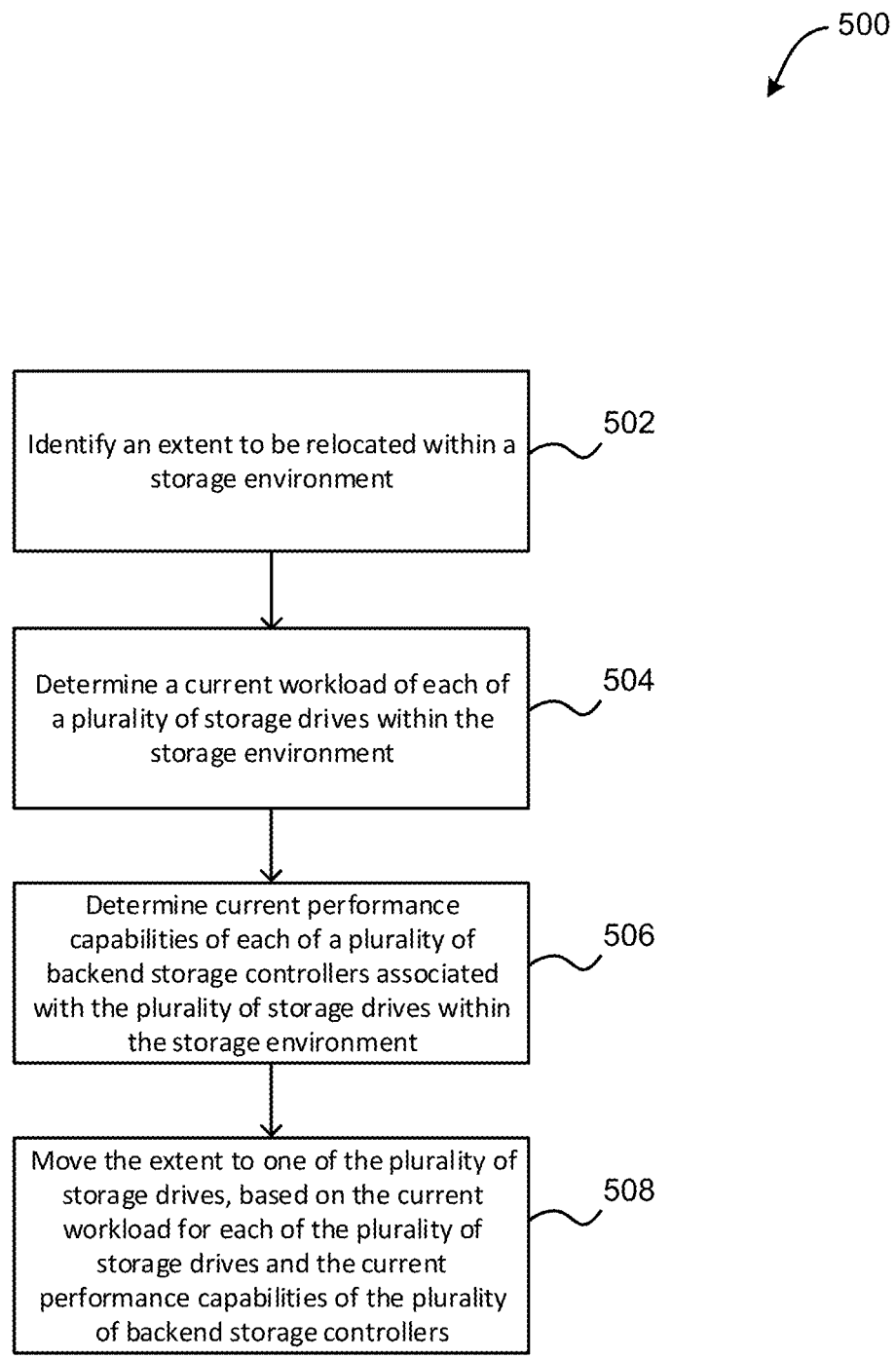
FIG. 5 illustrates a flowchart of a method for performing backend-aware extent balancing, in accordance with one embodiment.

Now referring to FIG. 5, a flowchart of a method 500 is shown according to one embodiment. The method 500 may be performed in accordance with the present invention in any of the environments depicted in FIGS. 1-4 and 7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an extent to be relocated within a storage environment is identified. In one embodiment, the extent may include a predetermined, contiguous area of storage within a storage drive of the storage environment. For example, the extent may be used to store data such as objects, files, etc. In another embodiment, the extent may be identified for relocation from a first storage drive to a second storage drive within the storage environment. For example, the extent may be identified as part of an extent balancing operation.

Additionally, in one embodiment, input/output (I/O) activity may be monitored for a plurality of extents over a predetermined period of time to determine a data access frequency for each of the plurality of extents. For example, the monitoring may be performed utilizing an I/O monitoring daemon. In another embodiment, extents that have a data access frequency that exceeds a predetermined threshold for the predetermined time period may be considered hot/heavily accessed. In yet another embodiment, the extent may be identified for relocation in response to determining that the extent is considered to be hot.

For example, identifying the extent to be relocated may include identifying that the extent has a data access frequency that exceeds a predetermined threshold. In another example, the storage environment may include a plurality of storage drives, and it may be determined that one of the storage drives currently stores a high amount of hot extents when compared to other storage drives. As a result, some hot extents may be selected for relocation to other storage drives that have fewer hot extents.

Further, in one embodiment, the storage environment may include one or more of cloud-based storage (e.g., storage utilized within a cloud computing environment, etc.), multi-tiered storage, virtualized storage, etc.

Further still, method 500 may proceed with operation 504, where a current workload of each of a plurality of storage drives within the storage environment is determined. In one embodiment, each of the plurality of storage drives may be represented by a logical unit number (LUN) that identifies the drive. In another embodiment, the plurality of storage drives may be located within one or more storage arrays within the storage environment. In yet another embodiment, the extent may be located within one of the plurality of storage drives.

Also, in one embodiment, the current workload of each of the plurality of storage drives may include a total amount of I/O activity associated with the drive (e.g., a current utilization of the drive) for a predetermined time period. In another embodiment, the current workload of each of the plurality of storage drives may include a total amount of extents located within the drive that are determined to be hot for a predetermined time period. In yet another embodiment, the predetermined time period may be the same predetermined time period for which I/O activity is monitored for the plurality of extents to determine the data access frequency for the plurality of extents.

In addition, method 500 may proceed with operation 506, where current performance capabilities of each of a plurality of backend storage controllers associated with the plurality of storage drives within the storage environment are determined. In one embodiment, the storage environment may include a plurality of storage drives managed by a plurality of backend storage controllers. For example, a backend storage controller may manage a plurality of storage drives within the storage environment. In another example, the plurality of storage drives may be grouped into a plurality of subsets. In yet another example, each subset of the plurality of storage drives may be managed by a different one of the plurality of backend storage controllers.

Furthermore, in one embodiment, a storage virtualization engine may communicate with and manage the backend storage controllers. In another embodiment, the storage virtualization engine may virtualize the plurality of storage drives so that they are viewed by one or more host applications as a single data storage unit. In yet another embodiment, the current performance capabilities for each of the plurality of backend storage controllers may include one or more of CPU usage, power usage, RAM usage, cache structure, included hardware, included software, processor speed, available space, latency associated with the storage controller, network status of the storage controller, type of the storage controller, tiering of the storage controller, etc.

Further still, in one embodiment, the current performance capabilities may also include an I/O pattern utilized by the backend storage controller. In another embodiment, the current performance capabilities may also include an indication as to whether the backend storage controller is capable of serving increased I/O traffic. In yet another embodiment, the current performance capabilities may also include an estimated performance of the backend storage controller if the extent is moved to a storage drive within the backend storage controller.

Also, in one embodiment, the current performance capabilities may also include a health of the backend storage controller. In another embodiment, the current performance capabilities may be measured for each of the plurality of backend storage controllers (e.g., utilizing a capability and status collector module located on each backend storage controller, etc.) over a predetermined time period. In yet another embodiment, the predetermined time period may be the same predetermined time period for which I/O activity is monitored for the plurality of extents to determine the data access frequency for the plurality of extents. In still another embodiment, the current performance capabilities for each of the plurality of backend storage controllers may indicate an amount of currently available resources at each of the plurality of backend storage controllers.

Further, in one embodiment, the current performance capabilities may be determined utilizing one or more application programming interfaces (APIs). For example, the current performance capabilities may be transmitted to a storage virtualization controller, utilizing one or more connection management APIs. In another embodiment, the current performance capabilities may be determined utilizing one or more interface or protocol enhancements.

Further still, method 500 may proceed with operation 508, where the extent is moved to one of the plurality of storage drives, based on the current workload for each of the plurality of storage drives and the current performance capabilities of the plurality of backend storage controllers. In one embodiment, a first storage drive having a smallest current workload may be determined from the plurality of storage drives. Additionally, in another embodiment, the current performance capabilities of a first backend storage controller that manages the first storage drive may be compared to current performance capabilities of a second backend storage controller that manages a second storage drive at which the extent is currently located.

Also, in one embodiment, if the current performance capabilities of the first backend storage controller are greater than the current performance capabilities of the second backend storage controller (e.g., the first backend storage controller has more available resources than the second backend storage controller), the extent may be moved to the first storage drive. In another embodiment, if the current performance capabilities of the first backend storage controller are less than the current performance capabilities of the second backend storage controller (e.g., the first backend storage controller has fewer available resources than the second backend storage controller), the extent may be moved to a third storage drive different from the first storage drive that is managed by a third backend storage controller.

In addition, in one embodiment, the third storage drive may be selected based on the current performance capabilities of its associated backend storage controller. For example, the extent may be moved to the third storage drive in response to determining that the current performance capabilities of the third backend storage controller are greater than the current performance capabilities of the second backend storage controller (e.g., the third backend storage controller has more available resources than the second backend storage controller). In another example, the extent may be moved to the third storage drive in response to a second determination that the third storage drive has a current workload less than the current workload of the second storage drive on which the extent is currently located.

Furthermore, in one embodiment, each of the plurality of storage drives may be assigned a value, based on the current workload for the drive and the current performance capabilities of the backend storage controller that manages the drive. For example, the current workload for the drive may correspond to a value based on predetermined criteria, such that when a first storage drive has a current workload smaller than a second storage drive, the current workload of the first storage drive will have a greater assigned value than the second storage drive.

Further still, in one embodiment, each of the current performance capabilities of the backend storage controller that manages the drive may correspond to additional values based on predetermined criteria, such that when a first backend storage controller that manages a first drive has more available resources than a second backend storage controller that manages a second drive, the current performance capabilities of the first backend storage controller may have a greater assigned value than the current performance capabilities of the second backend storage controller. In another embodiment, a higher value may correspond to a more favorable destination for the extent.

Also, in one embodiment, one or more of the values may be weighted. For example, if the current performance capabilities of the backend storage controller are determined to be more important than the current workload for the drive, a weighting multiplication factor may be added to the values associated with the current performance capabilities of the backend storage controller. In another embodiment, a sum of all values for the storage drive (e.g., the value for the current workload for the drive and the value for the current performance capabilities of the backend storage controller that manages the drive) may be determined, and the extent may be moved to the storage drive having the highest sum value.

Additionally, in one embodiment, the storage drive at which the extent is currently located may be located in a different storage tier than the storage drive to which the extent is moved. In another embodiment, the storage drive at which the extent is currently located may be located in the same storage tier as the storage drive to which the extent is moved.

Further, in one embodiment, the above operations may be performed by a storage virtualization engine of the storage environment. For example, the storage virtualization engine may determine the current workload of each of a plurality of storage drives within the storage environment, as well as the current performance capabilities of each of a plurality of backend storage controllers associated with the plurality of storage drives within the storage environment, utilizing one or more connection management APIs installed within the storage virtualization engine as well as each of the backend storage controllers.

In this way, the current performance capabilities of the plurality of backend storage controllers may be considered when performing extent balancing within a storage environment. This may avoid an overloading of one or more backend storage controllers when performing extent balancing, and may more evenly distribute hot extents amongst available backend storage controllers according to available resources of the backend storage controllers, which may improve the performance of all backend storage controllers within the storage environment. Additionally, one or more host applications relying on the storage environment to access the extent may be able to access the extent in an optimized fashion, which may improve a performance of the host applications.

Figure 6:
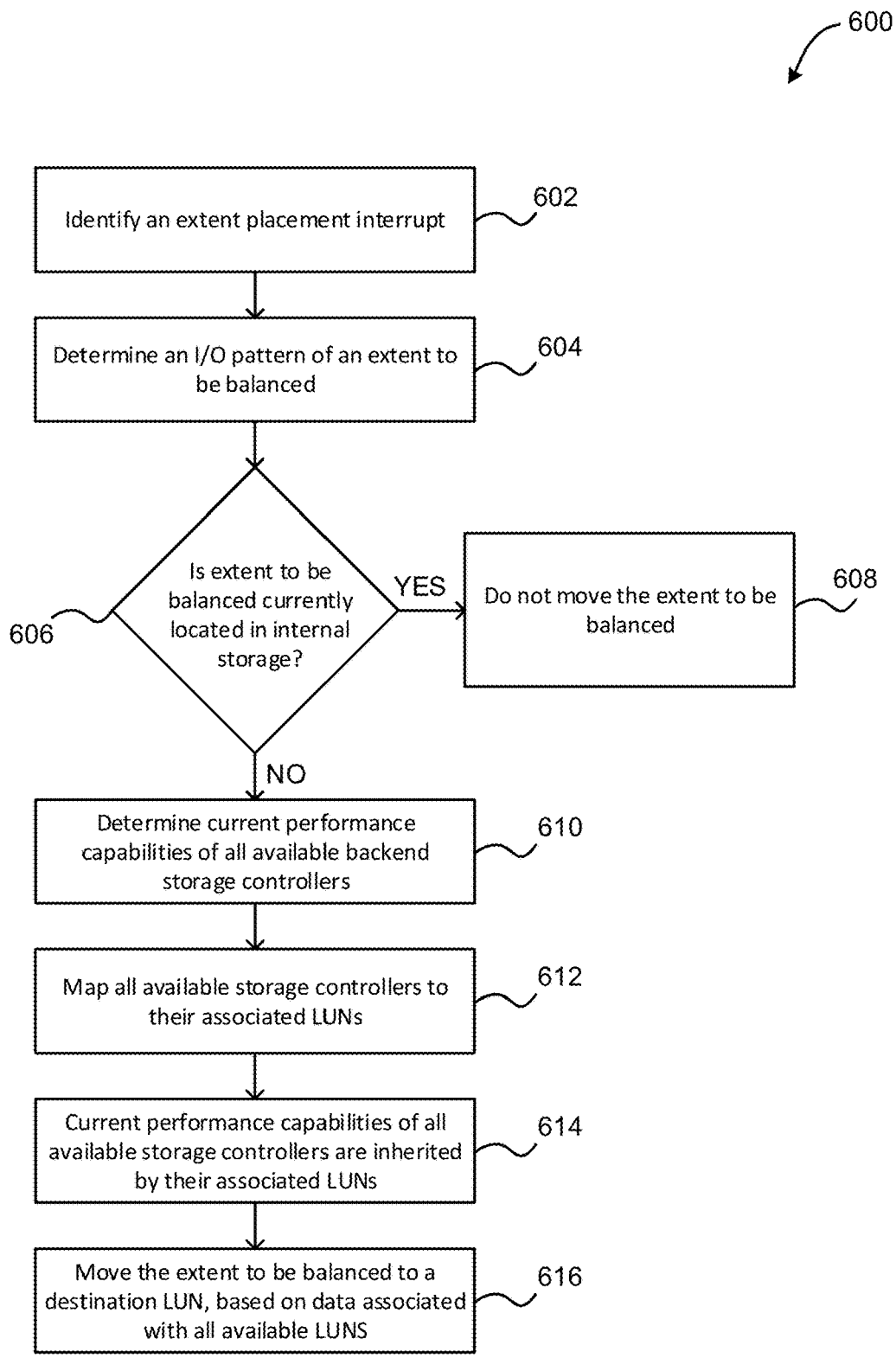
FIG. 6 illustrates a flowchart of a method for placing an extent within a storage environment, in accordance with one embodiment.

Now referring to FIG. 6, a flowchart of a method 600 for placing an extent within a storage environment is shown according to one embodiment. The method 600 may be performed in accordance with the present invention in any of the environments depicted in FIGS. 1-4 and 7, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where an extent placement interrupt is identified. In one embodiment, the extent placement interrupt may occur at a predefined time interval. In another embodiment, the extent placement interrupt may include a received interrupt signal. In yet another embodiment, the extent placement interrupt may include a notification to relocate the extent within a storage environment (e.g., within a current tier of the storage environment where the extent is currently stored, to a tier other than the current tier, etc.).

Additionally, method 600 may proceed with operation 604, where an I/O pattern of an extent to be balanced is determined. For example, the I/O pattern of the extent may include an I/O pattern used within a current storage drive to access the extent (e.g., during the predefined time interval, etc.).

Further, method 600 may proceed with decision 606, where it is determined whether the extent to be balanced is currently located in internal storage. If it is determined in decision 606 that the extent is currently located in internal storage, then method 600 may proceed with operation 608, where the extent to be balanced is not moved.

Further still, if it is determined in decision 606 that the extent to be balanced is not currently located in internal storage, then method 600 may proceed with operation 610, where current performance capabilities of all available backend storage controllers are determined. For example, current performance capabilities may be determined for the backend storage controllers during the predefined time interval. Also, method 600 may proceed with operation 612, where all available storage controllers are mapped to their associated LUNs, and method 600 may proceed with operation 614, where the current performance capabilities of all available storage controllers are inherited by their associated LUNs.

For example, a first storage controller may manage a first storage drive that is represented by a first LUN. A representation (e.g., an identifier, etc.) of the first storage controller may be mapped to the first LUN, and the current performance capabilities of the first storage controller may be transferred to the first LUN and saved in association with the first LUN.

In addition, method 600 may proceed with operation 616, where the extent to be balanced is moved to a destination LUN, based on data associated with all available LUNS. In one embodiment, for each of the available LUNs, the data associated with a LUN may include a current workload for the storage drive represented by the LUN, as well as the current performance capabilities of a storage controller mapped to the LUN.

In this way, the extent to be balanced may be moved to a destination LUN that has a current workload capable of supporting the extent, and that is managed by a storage controller that is capable of supporting the extent.

Figure 7:
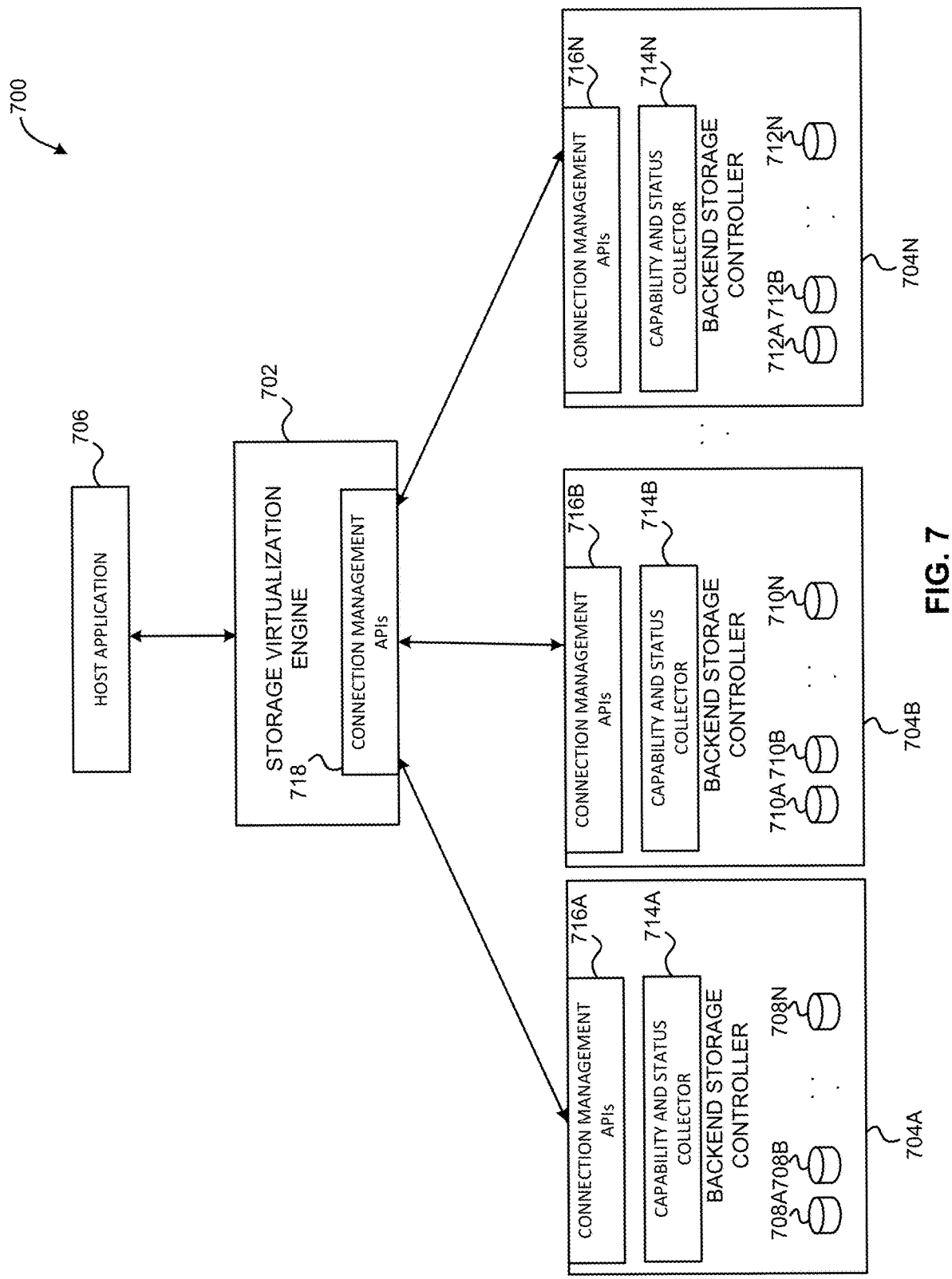
FIG. 7 illustrates an exemplary extent balancing architecture, in accordance with one embodiment.

FIG. 7 illustrates an exemplary extent balancing architecture 700, according to one embodiment. As shown, the architecture 700 includes a storage virtualization engine 702 in communication with a plurality of backend storage controllers 704A-N. In one embodiment, the storage virtualization engine 702 may manage the backend storage controllers 704A-N. In another embodiment, a host application 706 may access a plurality of storage drives 708A-N, 710A-N, and 712A-N, utilizing the storage virtualization engine 702.

Additionally, in one embodiment, the storage virtualization engine 702 may virtualize the plurality of storage drives 708A-N, 710A-N, and 712A-N so that they are viewed by a host application 706 as a single data storage element. In another embodiment, each of the plurality of backend storage controllers 704A-N may manage its associated plurality of storage drives 708A-N, 710A-N, and 712A-N. For example, a first backend storage controller 704A may manage its associated plurality of storage drives 708A-N.

Further, in one embodiment, a plurality of capability and status collectors 714A-N may collect current performance capabilities of the backend storage controllers 704A-N. For example, a first capability and status collector 714A may collect current performance capabilities of a first backend storage controller 704A for a predetermined time period. In another embodiment, these current performance capabilities may include a CPU usage of the first backend storage controller 704A, power usage of the first backend storage controller 704A, RAM usage of the first backend storage controller 704A, cache structure of the first backend storage controller 704A, an I/O pattern utilized by the first backend storage controller 704A, etc.

Further still, in one embodiment, current performance capabilities of the backend storage controllers 704A-N may be sent from the backend storage controllers 704A-N to the storage virtualization engine 702, utilizing connection management APIs 716A-N and 718. For example, the current performance capabilities of a first backend storage controller 704A may be sent from a first connection management API 716A of the first backend storage controller 704A to a second connection management API 718 of the storage virtualization engine 702. In this way, the storage virtualization engine 702 may retrieve all current performance capabilities of the backend storage controllers 704A-N.

Also, in one embodiment, the storage virtualization engine 702 may retrieve a current workload of each of the plurality of storage drives 708A-N, 710A-N, and 712A-N, utilizing the connection management APIs 716A-N and 718. In another embodiment, the storage virtualization engine 702 may relocate an extent to one of the plurality of storage drives 708A-N, 710A-N, and 712A-N, based on the current workload of each of each of the plurality of storage drives 708A-N, 710A-N, and 712A-N, as well as current performance capabilities of the backend storage controllers 704A-N.

In addition, in one embodiment, the extent may be relocated from one of the plurality of storage drives 708A-N, 710A-N, and 712A-N to another of the plurality of storage drives 708A-N, 710A-N, and 712A-N. For example, the plurality of storage drives 708A-N, 710A-N, and 712A-N may all be located within a single storage tier, and the extent may be moved within the storage tier. In another embodiment, the extent may be relocated to one of the plurality of storage drives 708A-N, 710A-N, and 712A-N from a drive other than the plurality of storage drives 708A-N, 710A-N, and 712A-N. For example, the plurality of storage drives 708A-N, 710A-N, and 712A-N may all be located within a single storage tier, and the extent may be moved from another storage tier to the storage tier.

In this way, extents may be placed within the storage drives 708A-N, 710A-N, and 712A-N based on both the current workload of each of each of the plurality of storage drives 708A-N, 710A-N, and 712A-N, as well as current performance capabilities of the backend storage controllers 704A-N. This may minimize an overall load placed on the backend storage controllers 704A-N, which may increase a performance of the backend storage controllers 704A-N.

Enhanced Application Performance and Improved Load Balancing Considerations in a Storage Virtualization Environment Multi-Tier Architecture Multi-tiered storage may include a storage method where data is stored on various types of storage devices based on one or more of criteria of the access, frequency of use, security and data recovery requirements, etc. For example, data that is frequently accessed by an application that is response time sensitive may be stored on one or more solid state drives (SSDs). Other data that is infrequently accessed and for which a higher response time is more tolerable may be stored on one or more high capacity 7.2K RPM drives. The cost per Gigabyte of storage is higher for SSDs than it is for the 7.2K RPM hard disk drives (HDDs). One challenge in effectively using multi-tiered storage is identifying the data that benefits from the higher cost/higher performance storage tiers, as over time, the optimal tier for a given piece of data may change. Thus, the identification and movement of data to the appropriate tier is an ongoing process.

In one embodiment, insights may be developed into the storage workload and the placement of data amongst different storage tiers may be automated in order to achieve the optimal performance through a software, server and storage solution. Since SSDs may be costlier than HDDs, this solution may allow a dynamic relocation of data of across tiers based on the data usage by placing "hot" data with high I/O density and low response time requirements on SSDs while targeting HDDs for "cooler" data that is accessed more sequentially and/or at lower rates.

Additionally, in one embodiment, an I/O monitoring daemon may monitor for I/O operations performed on HDDs. Based on data access frequency, it may identify data that is heavily accessed (e.g., "hot" data). A relocator may put this hot data on SSDs for high throughput, low response times and IOPS-energy-efficient characteristics. As a result, the amount of expensive storage required to meet a given level of performance may be minimized compared to other methods of data placement for tiered storage.

Extent Balancing Function

Balancing is a mechanism that deals with extent migration within the same storage tier and may be offered as a bundled solution with the tiering feature. The extent migration between same-tier LUNs may include intra-tier migration. If a disk is highly utilized (and the other disks of the same tier than that first are lesser utilized), then some hot extents may be moved to a lower-utilized disk if the lower-utilized disk does not reach a predetermined performance limit after the migration. Here, both the disks may be within the same tier. This feature of balancing may be available in all types of tiers. The balancing function may improve performance as hotter extents are distributed among multiple disks of the same tier. This function may play an important role in overloading scenarios, where extent migration may improve performance by great extent.

Backend Consideration

In one embodiment, backend performance and/or statistics and capabilities of the backend controllers may be considered while extent placement is performed by rebalancing and tiering daemons in the storage virtualization engine. While triggering rebalancing across the LUNs of the same tier, the capabilities (e.g., CPU power, RAM, cache structure, etc.) may be analyzed based on the nature of I/O expectations on that extent, and an extent may be placed to a suitable backend LUN. Balancing of the extents in the backend LUN may be handled by a balancing mechanism which may be offered as an integrated solution with tiering manager.

Additionally, in one embodiment, one job of a LUN balancing manager may include creating equilibrium across the backend LUNs connected to the virtualization engine on the basis of the loads experienced by the extent. If the extents in the volume are heavily accessed by application, then upon triggering a balancing function or tiering function, the workload on the extents may be examined based on a past access window time (e.g., a time window of 24 hours, etc.) and the extents may be dispersed across the backend LUNs which may be accessed by host applications with improved performance due to extent distribution and equality of load across the LUNs in the storage pool.

Further, in one embodiment, at the time of extent movement operation, the extent movement manager may identify a similar (or improved) performing backend controller based on the expected performance, disk type of the controller, and controller capabilities, and move the extent accordingly to sustain (or improve) the application performance. Once the management function is invoked by the storage system for extent distribution, the function may calculate the extents with their source and destination LUNs via discovering the information from associated backend arrays. If the source and target disks are not comprised of an improved controller type, improved health status and desired characteristics, then this algorithm checks for another backend controller for extent placement to ensure the application performance after movement. If the improved backend destination has space available and no other candidate has claimed it for movement by balancing and/or tiering manager, then the extent may be placed in this selected LUN which may include an improved performing destination, and applications accessing data may experience improved performance due to a healthier backend array and improved load distribution across the LUNs in the storage pool.

Resolved Performance Issues

In one embodiment, if the extent is situated on a high performing backend and is being moved to a slow backend by an extent management mechanism, then an I/O latency may be increased because of a performance issue at backend level. For example, if the extent is moved to a controller which is already loaded with 90% CPU consumption due to internal disk failures and rebuilding processes, an application accessing such extent may started showing more latency after balancing. If the extent is being moved to a damaged backend, then it may add the latency cost to application I/O. The damaged backend may include a backend having one or more failed drives, or RAID in a state of rebuild, or a backend having ports that are not functional, etc. All of these performance issues may be resolved by considering a state of the backend during extent movement.

Exemplary Advantages

By considering current performance capabilities of a plurality of backend storage controllers when performing extent balancing within a storage environment, an optimal performance may be achieved during extent balancing across the LUNs of same-tier and inter-tier migration that is virtualized from heterogenous backend controllers. If the blocks are heavily accessed, then that block will not be moved a controller whose CPU is already overrunning.

Additionally, the consideration of backend capabilities may be integrated into extent movement functionality, where such consideration may include access counts and access patterns. The handle may then be passed to a Data Migrator queue for executing a migration plan. Further, the connected storage arrays behind the virtualization engine may be represented with respect to their capacity, capability and ability to work considering their situations. Further still, application performance expectations may be met with desired performance after the extent movement.

Further, an inbound or out-of-bound API solution may be provided to collect the performance statistics from backend storage arrays. Additionally, the performance and hardware/software capabilities present at backend level may be discovered and advertised via interface or protocol enhancements (e.g., SCSI, NVMeF, etc.). Further, a tiering threshold may be changed, and thresholds may be re-balanced, based on discovered backend statistics such as processor speed, suitable workload, types of disks, overloading, cache and processor capabilities and other hardware and software.

Further still, the frontend load balancing values may be updated, and dynamic threshold adjusting of third party storage arrays connected to virtualization system may be performed. Also, a triggering/balancing cycle may be injected in case warm-rebalancing is needed. For example, in case one of the backend storage controllers is running with more than 90% CPU, and other backend storage controllers are detected at below 30%, then a warm-rebalancing may be triggered on the frontend to distribute the extents across the backend storage controllers.

In addition, suitable I/O pattern may be queried from external third-party storage. For example, in case one of the backend storage controllers has no cache (or has an improved I/O stack to process sequential I/O like tape storage), the backend storage controller may be preferred for sequential I/O operations. If a backend storage controller has a large cache, then a suitable I/O pattern may be different, which may be enquired via one or more APIs and a mechanism of responding by client APIs.

Exemplary Implementation Flow

The following exemplary implementation flow steps describe the movement of extents from a first LUN to a second LUN by an extent movement algorithm.

Start
Initiate Information collection APIs on virtualization engine and on backend storage array
Initiate the communication to the backend using this API for information exchange upon request-response.
Upon predefined interval or extent placement interrupt SIGNAL
For each extent in the all the pools in the system:
    Detect for extent relocation candidate based on criteria of extent temperature
    Analyze the extent I/O pattern for detection of suitable target
    If extent is from internal disk storage
        Continue
    Else, For all the backend controllers in the system
        Inquire_capabilities(Controller id, capability list [ ])
        Map associated controllers and LUNs and inherit capabilities to the LUNs
        Collect the information provided and select the best suitable destination
        Update the relocation candidates based on the capabilities discovered
        Estimate post relocation scenario and take actions accordingly
        Move the extent list E to destination selected
Operation completed Exemplary API Functions The following is a list of exemplary enquire capabilities API functions that may be used to determine current performance capabilities of the plurality of backend storage controllers, as well as accompanying descriptions.

Void initialize_API_instance_backend(Controller_name)//This function may initialize the APIs, start connection sockets, start listening and advertising itself for the mentioned controller to get the system started and to collect information in later stages of operations.

Controller_type=Get_controller_type(extents)//This may provide an external controller type and speed of operation, major architectural advertisement (like cache, tiering, etc.), average latency, any known limitation, controller level faults details upon request.

geometry_status=get_target_controller_stats (raid[extent])//This status may be online, degraded, failed, etc., which may indicate the status of the controller and its partner nodes where the tiering mechanism is planning to place the extent performance status=get_performance_status_of_target (controller[extent])//The possible values of this function may include current latency values, overloading details, current CPU consumption, etc.

Is_space_available=get_space_information_target (LUN_ID)//this function may provide the space availability at the target LUN which may be utilized by the proposed system to select the proper destination.

Estimation_of_movement=get_Estimation_after_movement (Extent E, LUN X) //this function may provide the estimation of the backend array's status in case the extent E is moved to LUN X. For example, if the extent E100 is decided to move in LUN21, then this function may estimate the backend controller status if E100 is moved to LUN21. Based on this estimation, it may be decided whether to place E100 in LUN21 or not.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying an extent to be relocated within a storage environment;
determining a current workload of each of a plurality of storage drives within the storage environment;
assigning a first value to each of the plurality of storage drives, based on the current workload of each of the plurality of storage drives;
determining current performance capabilities of each of a plurality of backend storage controllers associated with the plurality of storage drives within the storage environment;
assigning a second value to each of the plurality of storage drives, based on the current performance capabilities of each of the plurality of backend storage controllers;
weighting the second value of each of the plurality of storage drives by adding a weighting multiplication factor to the second value, in response to determining that the current performance capabilities of each of the plurality of backend storage controllers have a higher importance than the current workload of each of the plurality of storage drives; and moving the extent to one of the plurality of storage drives, based on the current workload for each of the plurality of storage drives and the current performance capabilities of the plurality of backend storage controllers, including:
for each of the plurality of storage drives, summing the first value and the weighted second value for the storage drive to determine a sum value for each of the plurality of storage drives, and
moving the extent to one of the plurality of storage drives having a highest sum value.

2. The computer-implemented method of claim 1, wherein the extent is identified for relocation in response to determining that the extent has a data access frequency that exceeds a predetermined threshold for a predetermined time period.

3. The computer-implemented method of claim 1, wherein each of the plurality of storage drives is represented by a logical unit number (LUN) that identifies the storage drive.

4. The computer-implemented method of claim 1, wherein the current workload of each of the plurality of storage drives includes a total amount of input/output (I/O) activity associated with the storage drive for a predetermined time period.

5. The computer-implemented method of claim 1, wherein the current workload of each of the plurality of storage drives includes a total number of extents located within each of the plurality of storage drives that are determined to be hot for a predetermined time period.

6. The computer-implemented method of claim 1, wherein the current performance capabilities for each of the plurality of backend storage controllers include:
a central processing unit (CPU) usage of the backend storage controller,
a power usage of the backend storage controller,
a random access memory (RAM) usage of the backend storage controller,
a cache structure of the backend storage controller,
included hardware within the backend storage controller,
included software within the backend storage controller,
a processor speed of the backend storage controller,
an available space of the backend storage controller,
a latency associated with the backend storage controller,
a network status of the backend storage controller,
a type of the backend storage controller, and
a tiering of the backend storage controller.

7. The computer-implemented method of claim 1, wherein the current performance capabilities include an I/O pattern utilized by each of the plurality of backend storage controllers.

8. The computer-implemented method of claim 1, wherein the current performance capabilities include an indication as to whether each of the plurality of backend storage controllers is capable of serving increased I/O traffic.

9. The computer-implemented method of claim 1, wherein the current performance capabilities include, for each of the plurality of backend storage controllers, an estimated performance of the backend storage controller if the extent is moved to a storage drive managed by the backend storage controller.

10. The computer-implemented method of claim 1, wherein the current performance capabilities are measured for each of the plurality of backend storage controllers over a predetermined time period.

11. The computer-implemented method of claim 1, wherein the current performance capabilities are determined utilizing one or more application programming interfaces (APIs).

12. The computer-implemented method of claim 1, wherein a storage drive at which the extent is currently located is located in a same storage tier as a storage drive to which the extent is moved.

13. The computer-implemented method of claim 1, wherein a storage drive at which the extent is currently located is located in a different storage tier than a storage drive to which the extent is moved.

14. A computer program product for performing backend-aware extent balancing, the computer program product comprising a computer readable storage medium having program instructions embodied therewith, wherein the computer readable storage medium is not a transitory signal per se, the program instructions executable by a processor to cause the processor to perform a method comprising:
identifying an extent to be relocated within a storage environment, utilizing the processor;
determining a current workload of each of a plurality of storage drives within the storage environment, utilizing the processor;
assigning, utilizing the processor, a first value to each of the plurality of storage drives, based on the current workload of each of the plurality of storage drives;
determining current performance capabilities of each of a plurality of backend storage controllers associated with the plurality of storage drives within the storage environment, utilizing the processor;
assigning, utilizing the processor, a second value to each of the plurality of storage drives, based on the current performance capabilities of each of the plurality of backend storage controllers;
weighting, utilizing the processor, the second value of each of the plurality of storage drives by adding a weighting multiplication factor to the second value, in response to determining that the current performance capabilities of each of the plurality of backend storage controllers have a higher importance than the current workload of each of the plurality of storage drives; and
moving the extent to one of the plurality of storage drives, utilizing the processor, based on the current workload for each of the plurality of storage drives and the current performance capabilities of the plurality of backend storage controllers, including:
for each of the plurality of storage drives, summing the first value and the weighted second value for the storage drive to determine a sum value for each of the plurality of storage drives, and
moving the extent to one of the plurality of storage drives having a highest sum value.

15. The computer program product of claim 14, wherein the extent is identified for relocation in response to determining that the extent has a data access frequency that exceeds a predetermined threshold for a predetermined time period.

16. The computer-implemented method of claim 1, wherein the extent is identified in response to an extent placement interrupt.

17. The computer-implemented method of claim 1, further comprising:
monitoring input/output (I/O) activity for a plurality of extents over a predetermined time period to determine a data access frequency for each of the plurality of extents; and determining that the extent is hot in response to identifying that the extent has a data access frequency that exceeds a predetermined threshold for the predetermined time period;

wherein the extent is identified for relocation in response to determining that the extent is hot.

18. A system, comprising:

a processor; and logic integrated with the processor, executable by the processor, or integrated with and executable by the processor, the logic being configured to:
  identify an extent to be relocated within a storage environment;
  determine a current workload of each of a plurality of storage drives within the storage environment;
  assign a first value to each of the plurality of storage drives, based on the current workload of each of the plurality of storage drives;
  determine current performance capabilities of each of a plurality of backend storage controllers associated with the plurality of storage drives within the storage environment;
  assign a second value to each of the plurality of storage drives, based on the current performance capabilities of each of the plurality of backend storage controllers;
  weight the second value of each of the plurality of storage drives by adding a weighting multiplication factor to the second value, in response to determining that the current performance capabilities of each of the plurality of backend storage controllers have a higher importance than the current workload of each of the plurality of storage drives; and
  move the extent to one of the plurality of storage drives, based on the current workload for each of the plurality of storage drives and the current performance capabilities of the plurality of backend storage controllers, including:
    for each of the plurality of storage drives, summing the first value and the weighted second value for the storage drive to determine a sum value for each of the plurality of storage drives, and
    moving the extent to one of the plurality of storage drives having a highest sum value.

* * * * *